(12) United States Patent
Lee et al.

(10) Patent No.: US 10,889,361 B2
(45) Date of Patent: Jan. 12, 2021

(54) SHIP COMPRISING ENGINE

(71) Applicant: DAEWOO SHIPBUILDING & MARINE ENGINEERING CO., LTD., Seoul (KR)

(72) Inventors: Joon Chae Lee, Seoul (KR); Won Jae Choi, Seoul (KR)

(73) Assignee: Daewoo Shipbuilding & Marine Engineering Co., Ltd., Geoje-si (KR)

( * ) Notice: Subject to any disclaimer, the term of this patent is extended or adjusted under 35 U.S.C. 154(b) by 0 days.

(21) Appl. No.: 15/742,839

(22) PCT Filed: Jun. 29, 2016

(86) PCT No.: PCT/KR2016/006971
§ 371 (c)(1),
(2) Date: Jan. 8, 2018

(87) PCT Pub. No.: WO2017/007167
PCT Pub. Date: Jan. 12, 2017

(65) Prior Publication Data
US 2018/0194447 A1      Jul. 12, 2018

(30) Foreign Application Priority Data

Jul. 8, 2015   (KR) .................. 10-2015-0097308
Dec. 9, 2015   (KR) .................. 10-2015-0175090

(51) Int. Cl.
*F01K 25/08*   (2006.01)
*F25J 1/00*    (2006.01)
(Continued)

(52) U.S. Cl.
CPC ............ B63H 21/38 (2013.01); B63B 25/16 (2013.01); F02M 21/0221 (2013.01); F17C 6/00 (2013.01);
(Continued)

(58) Field of Classification Search
CPC .......... F17C 2265/032; F17C 2265/033; F17C 2265/034; F17C 2265/035;
(Continued)

(56) References Cited

U.S. PATENT DOCUMENTS 3,857,245 A      12/1974  Jones
3,885,394 A *    5/1975   Witt .................. B63H 21/00
                                                    60/651

(Continued)

FOREIGN PATENT DOCUMENTS

DE    4440406 C1 *   4/1996  ............. F25J 1/0022
EP    3305647 A1     4/2018
(Continued)

OTHER PUBLICATIONS

International Search Report dated Oct. 7, 2016 of PCT/KR2016/006971 which is the parent application and its English translation in 6 pages.

(Continued)

*Primary Examiner* — Frantz F Jules
*Assistant Examiner* — Erik Mendoza-Wilkenfel
(74) *Attorney, Agent, or Firm* — K&L Gates LLP

(57) ABSTRACT

A ship comprising an engine is disclosed. The ship comprising an engine comprises: a self-heat exchanger which heat-exchanges boil-off gas discharged from a storage tank; a multi-stage compressor which compresses, in multi-stages, boil-off gas that passed through the self-heat exchanger after being discharged from the storage tank; a first decompressing device which expands one portion of boil-off gas that passed through the self-heat exchanger after being compressed by the multi-stage compressor; and a second decompressing device which expands the other portion of the boil-off gas that passed through the self-heat exchanger after being compressed by the multi-stage compressor, wherein (Continued)

the self-heat exchanger uses boil-off gas discharged from the storage tank and boil-off gas expanded by the first decompressing device as refrigerants for cooling boil-off gas compressed by the multi-stage compressor.

11 Claims, 7 Drawing Sheets

(51) Int. Cl.
*B63B 25/16* (2006.01)
*B63H 21/38* (2006.01)
*F17C 6/00* (2006.01)
*F25J 1/02* (2006.01)
*F02M 21/02* (2006.01)

(52) U.S. Cl.
CPC ............. *F25J 1/004* (2013.01); *F25J 1/0025* (2013.01); *F25J 1/0045* (2013.01); *F25J 1/0202* (2013.01); *F25J 1/023* (2013.01); *F25J 1/0277* (2013.01); *F17C 2223/0153* (2013.01); *F17C 2227/0157* (2013.01); *F17C 2265/038* (2013.01); *F25J 2220/62* (2013.01); *F25J 2230/30* (2013.01); *Y02T 10/30* (2013.01)

(58) Field of Classification Search
CPC .......... F17C 2265/036; F17C 2265/037; F17C 2265/038; F01K 25/08; F25J 1/0025; F25J 2245/90; F25J 1/004; F25J 1/0045; F25J 1/0202; F25J 1/023; F25J 1/0277; F02M 21/0221; B63B 25/16
See application file for complete search history.

(56) References Cited

U.S. PATENT DOCUMENTS

| | | | |
|---|---|---|---|
| 3,919,852 A | 11/1975 | Jones | |
| 5,036,671 A * | 8/1991 | Nelson | F25J 1/0022 |
| | | | 62/48.2 |
| 2014/0250922 A1* | 9/2014 | Kang | F02M 21/0215 |
| | | | 62/50.2 |
| 2014/0290279 A1* | 10/2014 | Lee | B63B 25/16 |
| | | | 62/48.2 |

FOREIGN PATENT DOCUMENTS

| | | |
|---|---|---|
| JP | 50-22771 A | 3/1975 |
| JP | 2015-505941 A | 2/2015 |
| KR | 10-2012-0049731 A | 5/2012 |
| KR | 10-1310025 B1 | 9/2013 |
| KR | 10-2013-0139150 A | 12/2013 |
| KR | 10-1356003 B1 | 2/2014 |
| KR | 10-1441243 B1 | 9/2014 |
| KR | 10-2015-0001597 A | 1/2015 |
| KR | 10-2015-0039427 A | 4/2015 |
| KR | 10-1511214 B1 | 4/2015 |
| WO | WO-2016200089 A1 * | 12/2016 ............. B63B 25/16 |

OTHER PUBLICATIONS

Office Action dated Feb. 7, 2017 of corresponding Korean Patent Application No. 10-2015-0175090—5 pages.
Search Report and Written Opinion of corresponding Singaporean Patent Application No. 11201800183Y—9 pages (dated Oct. 10, 2018).
Notice of Allowance of corresponding Singaporean Patent Application No. 11201800183Y—4 pages (dated Sep. 12, 2019).
Extended European Search Report of corresponding European Patent Application No. 16821573.9—13 pages (dated Apr. 17, 2019).
Office Action of corresponding Japanese Patent Application No. 2018-500458—6 pages (dated Jun. 2, 2020).
English Translation of Office Action and Search Report in corresponding Russian Patent Application No. 2018104686 dated Oct. 9, 2019, 5 pages.
Office Action and Search Report with its English Translation of corresponding Russian Patent Application No. 2018104686 dated Oct. 9, 2019, 9 pages.

\* cited by examiner

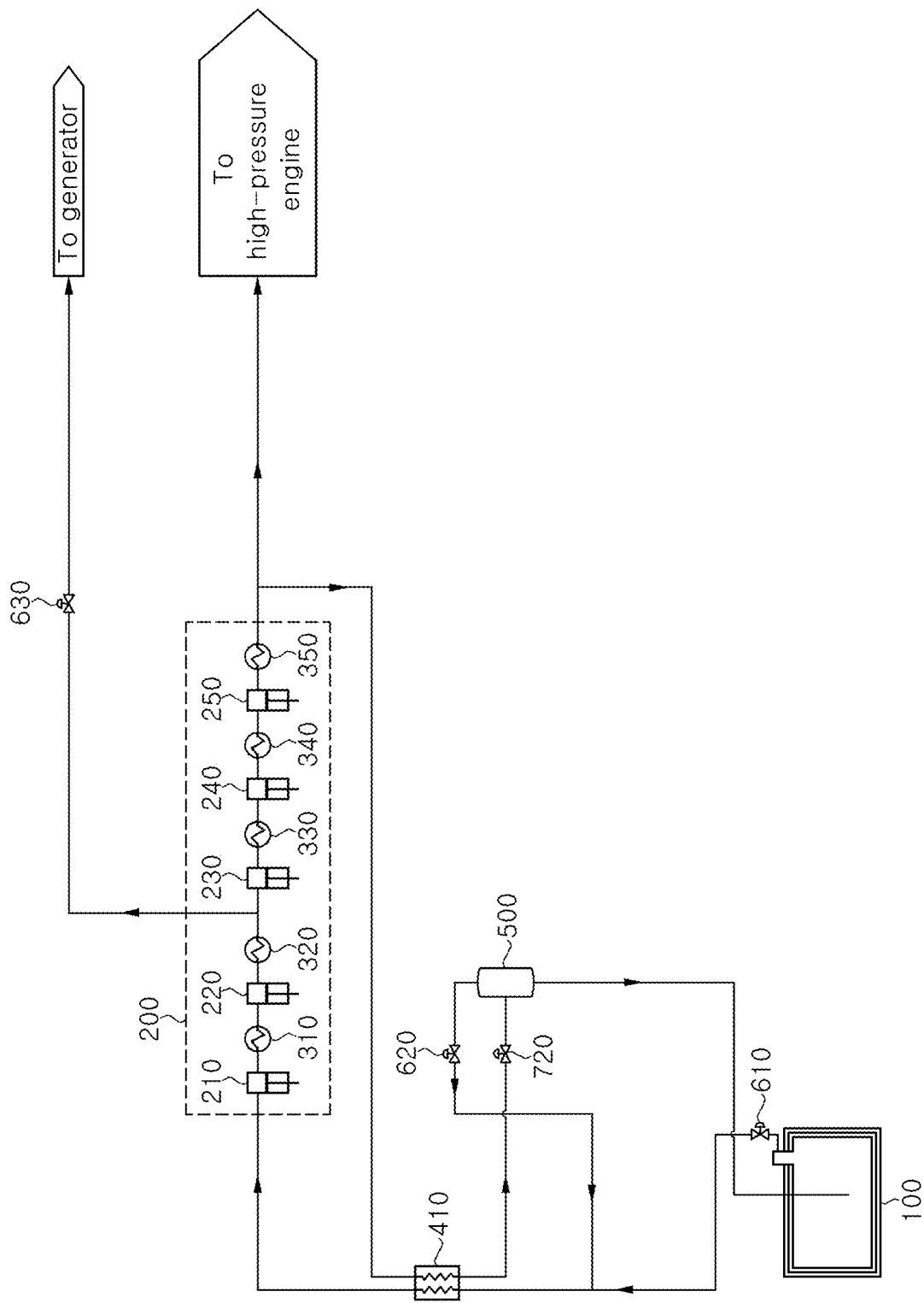
[FIG. 1]

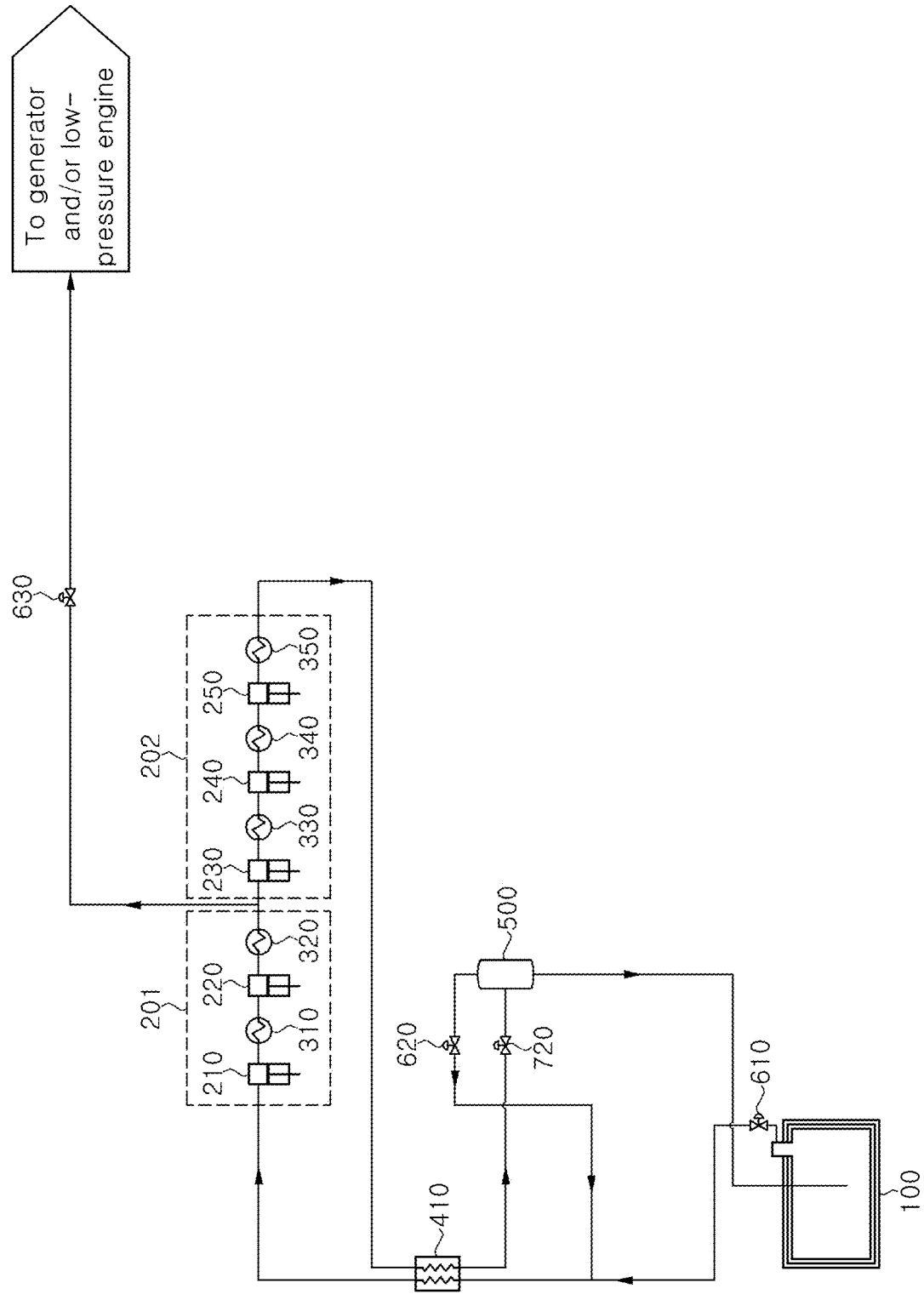
[FIG. 2]

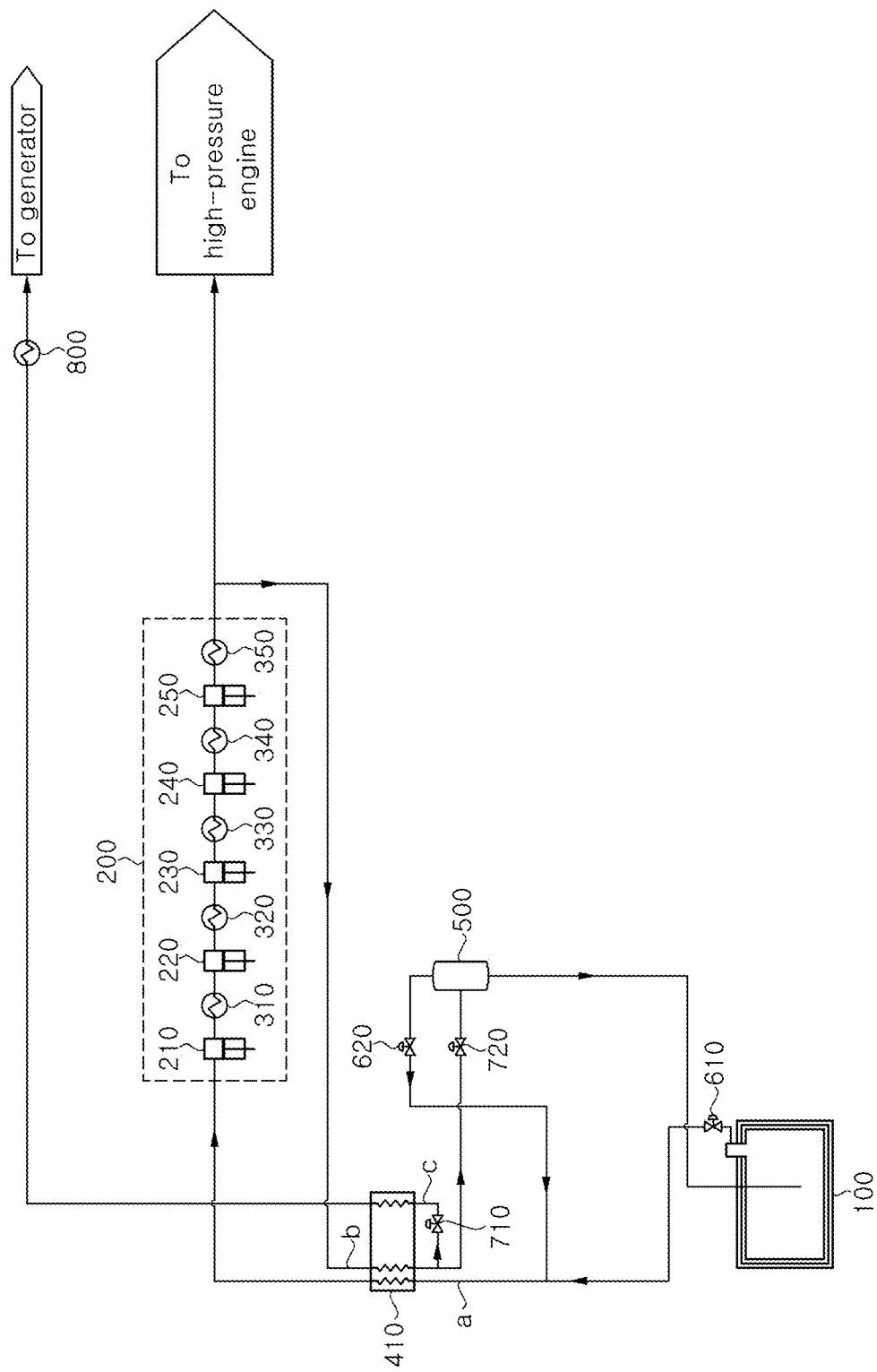
[FIG. 3]

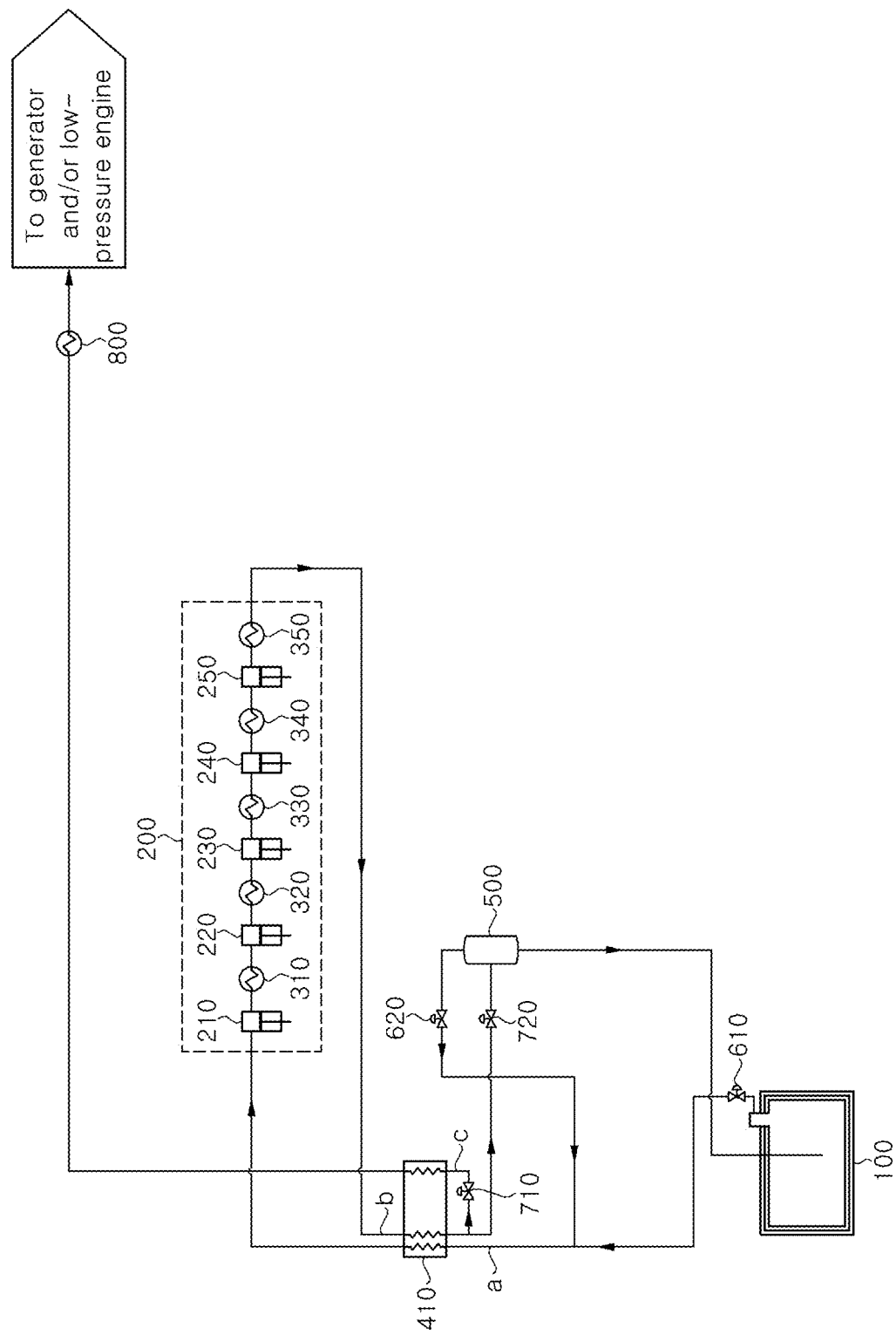
[FIG. 4]

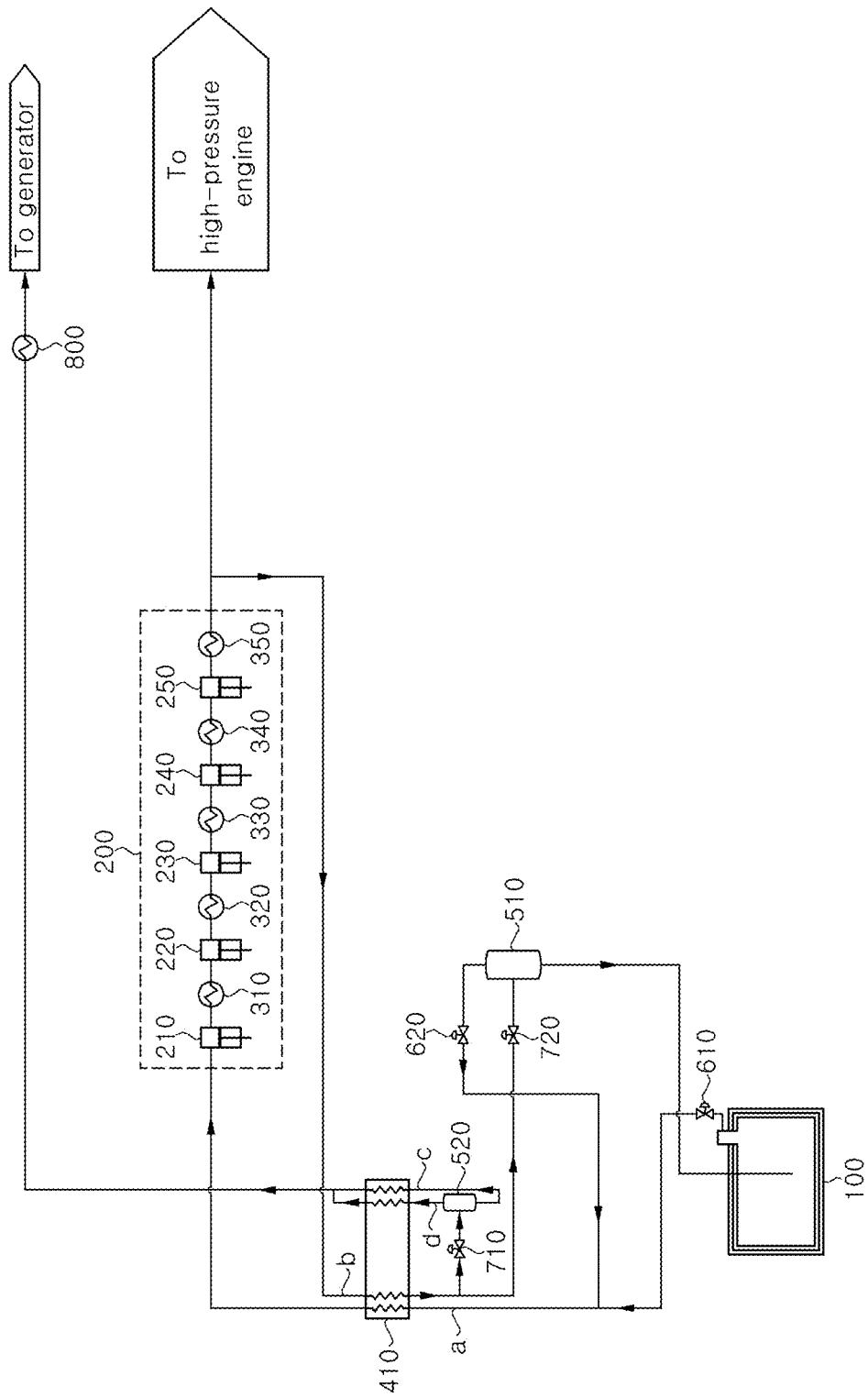
[FIG. 5]

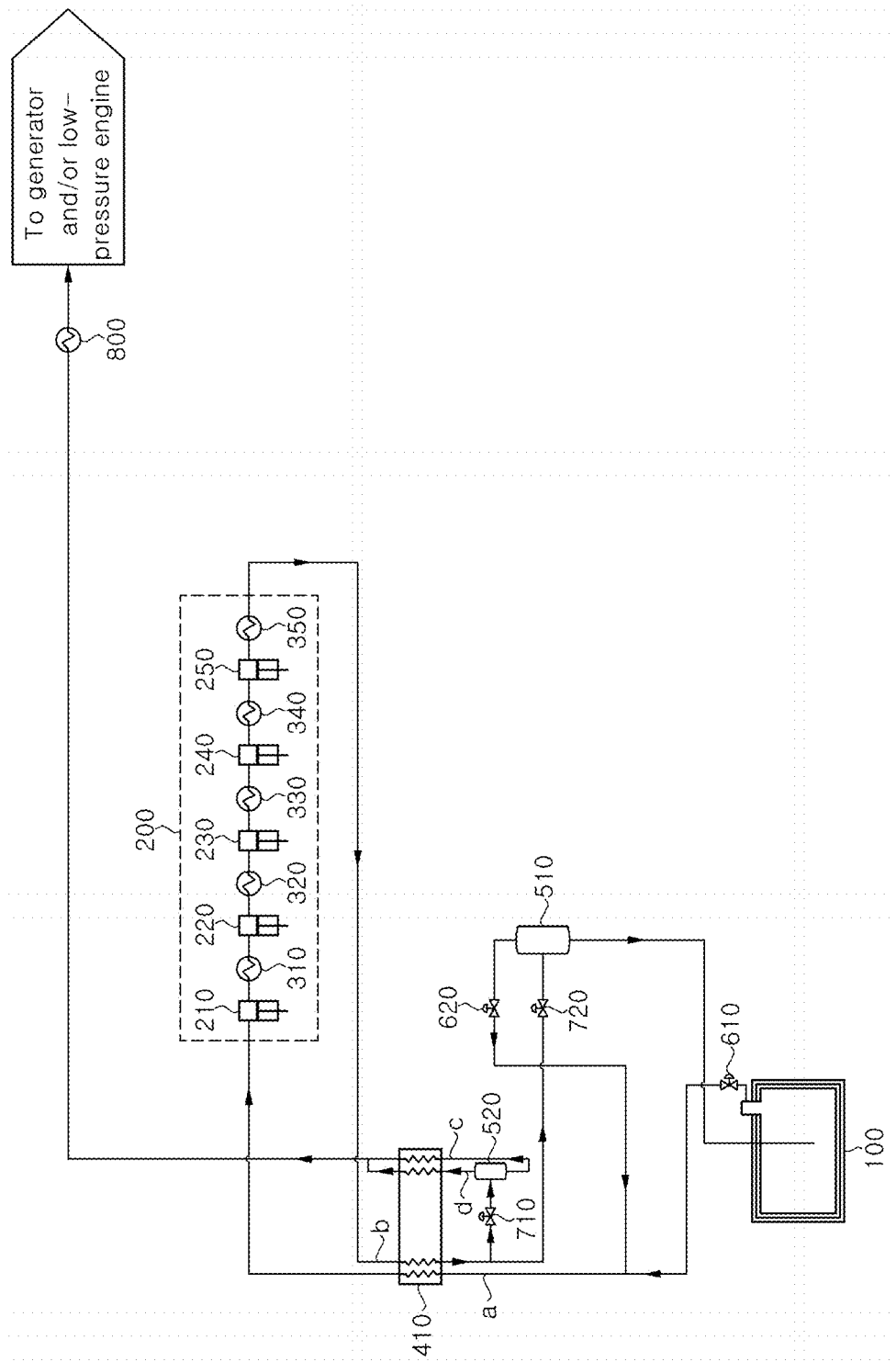
[FIG. 6]

[FIG. 7]
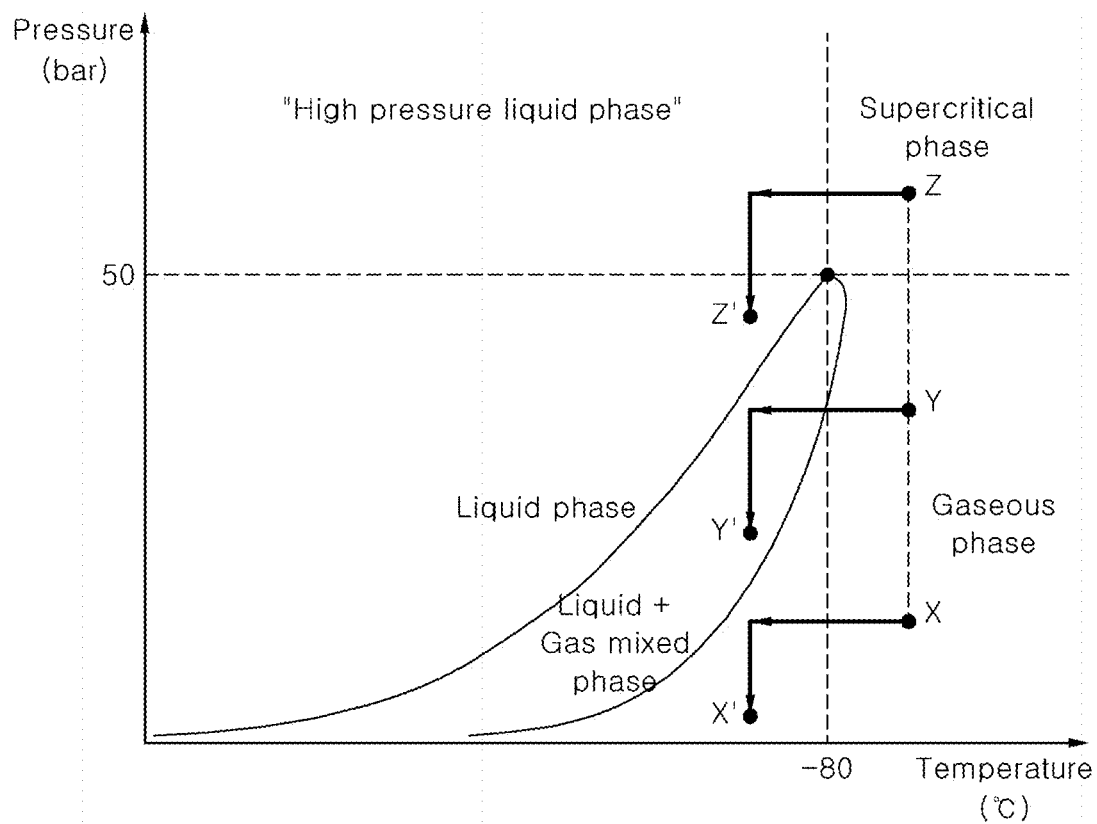

SHIP COMPRISING ENGINE

TECHNICAL FIELD

The present invention relates to a ship including an engine and, more particularly, to a ship including an engine, in which boil-off gas (BOG) remaining after being used as fuel in the engine is reliquefied into liquefied natural gas using boil-off gas as a refrigerant and is returned to a storage tank.

BACKGROUND ART

Generally, natural gas is liquefied and transported over a long distance in the form of liquefied natural gas (LNG). Liquefied natural gas is obtained by cooling natural gas to a very low temperature of about −163° C. at atmospheric pressure and is well suited to long-distance transportation by sea, since the volume thereof is significantly reduced, as compared with natural gas in a gas phase.

Even when an LNG storage tank is insulated, there is a limit to completely blocking external heat. Thus, LNG is continuously vaporized in the LNG storage tank by heat transferred into the storage tank. LNG vaporized in the storage tank is referred to as boil-off gas (BOG).

If the pressure in the storage tank exceeds a predetermined safe pressure due to generation of boil-off gas, the boil-off gas is discharged from the storage tank through a safety valve. The boil-off gas discharged from the storage tank is used as fuel for a ship, or is re-liquefied and returned to the storage tank.

Examples of a marine engine capable of being fueled by natural gas include a dual fuel (DF) engine and an ME-GI engine.

A DFDE engine has four strokes per cycle and uses the Otto cycle in which natural gas having a relatively low pressure of about 6.5 bar is injected into a combustion air inlet, followed by pushing a piston upward to compress the gas.

An ME-GI engine has two strokes per cycle and uses a diesel cycle in which natural gas having a high-pressure of about 300 bar is injected directly into a combustion chamber in the vicinity of the top dead center of a piston. Recently, the ME-GI engine has been more attracted due to better fuel efficiency and propulsion efficiency thereof.

DISCLOSURE

Technical Problem

Typically, a BOG reliquefaction system employs a cooling cycle for reliquefaction of BOG through cooling. Cooling of BOG is performed through heat exchange with a refrigerant and a partial reliquefaction system (PRS) using BOG itself as a refrigerant is used in the art.

FIG. 1 is a schematic diagram of a partial reliquefaction system applied to a ship including a high-pressure engine in the related art.

Referring to FIG. 1, in a partial reliquefaction system applied to a ship including a high-pressure engine in the related art, BOG discharged from a storage tank 100 is sent to a self-heat exchanger 410 via a first valve 610. The BOG discharged from the storage tank 100 and subjected to heat exchange with a refrigerant in the self-heat exchanger 410 is subjected to multiple stages of compression by a multistage compressor 200, which includes a plurality of compression cylinders 210, 220, 230, 240, 250 and a plurality of coolers 310, 320, 330, 340, 350. Then, some BOG is sent to a high-pressure engine to be used as fuel and the remaining BOG is sent to the self-heat exchanger 410 to be cooled through heat exchange with BOG discharged from the storage tank 100.

The BOG cooled by the self-heat exchanger 410 after multistage compression is partially reliquefied by a decompressor 720 and is separated into liquefied natural gas generated through reliquefaction and gaseous BOG by a gas/liquid separator 500. The reliquefied natural gas separated by the gas/liquid separator 500 is sent to the storage tank 100, and the gaseous BOG separated by the gas/liquid separator 500 is joined with BOG discharged from the storage tank 100 after passing through a second valve 620 and is then sent to the self-heat exchanger 410.

On the other hand, some of the BOG discharged from the storage tank 100 and having passed through the self-heat exchanger 410 is subjected to a partial compression process among multiple stages of compression (for example, passes through two compression cylinders 210, 220 and two coolers 310, 320 among five compression cylinders 210, 220, 230, 240, 250 and five coolers 310, 320, 330, 340, 350), divided to a third valve 630, and finally sent to a generator. Since the generator requires natural gas having a lower pressure than pressure required for the high-pressure engine, the BOG subjected to the partial compression process is supplied to the generator.

FIG. 2 is a schematic diagram of a partial reliquefaction system applied to a ship including a high-pressure engine in the related art.

Referring to FIG. 2, as in the partial reliquefaction system applied to a ship including a high-pressure engine, in a partial reliquefaction system applied to a ship including a low-pressure engine in the related art, BOG discharged from a storage tank 100 is sent to a self-heat exchanger 410 via a first valve 610. As in the partial reliquefaction system shown in FIG. 1, the BOG having been discharged from the storage tank 100 and passed through the self-heat exchanger 410 is subjected to multiple stages of compression by a multistage compressor 201, 202 and is then sent to the self-heat exchanger 410 to be cooled through heat exchange with BOG discharged from the storage tank 100.

As in the partial reliquefaction system shown in FIG. 1, the BOG cooled by the self-heat exchanger 410 after multistage compression is partially reliquefied by a decompressor 720 and is separated into liquefied natural gas generated through reliquefaction and gaseous BOG by a gas/liquid separator 500. The reliquefied natural gas separated by the gas/liquid separator 500 is sent to the storage tank 100, and the gaseous BOG separated by the gas/liquid separator 500 is joined with BOG discharged from the storage tank 100 after passing through a second valve 620 and is then sent to the self-heat exchanger 410.

Here, unlike the partial reliquefaction system shown in FIG. 1, in the partial reliquefaction system applied to a ship including a low-pressure engine in the related art, the BOG subjected to the partial compression process among the multiple stages of compression is divided and sent to the generator and the engine and all of the BOG subjected to all of the multiple stages of compression is sent to the self-heat exchanger 410. Since low-pressure engine requires natural gas having a similar pressure to pressure required for the generator, the BOG subjected to the partial compression process is supplied to the low-pressure engine and the generator.

In the partial reliquefaction system applied to the ship including a high-pressure engine in the related art, since some of the BOG subjected to all of the multiple stages of compression is sent to the high-pressure engine, a single multistage compressor 200 having capacity required for the high-pressure engine is installed.

However, in the partial reliquefaction system applied to the ship including a low-pressure engine in the related art, since the BOG subjected to the partial compression process among the multiple stages of compression is sent to the generator and the engine and the BOG subjected to all of the multiple stages of compression is not sent to the engine, none the compression stages require a large capacity compression cylinder.

Accordingly, some of BOG compressed by a first multistage compressor 201 having a relatively large capacity is divided and sent to the generator and the engine, and the remaining BOG is additionally compressed by a second multistage compressor 201 having a relatively small capacity and sent to the self-heat exchanger 410.

In the partial reliquefaction system applied to the ship including a low-pressure engine in the related art, the capacity of the compressor is optimized depending upon the degree of compression required for the generator or the engine in order to prevent increase in manufacturing cost associated with the capacity of the compressor, and installation of two multistage compressors 201, 202 provides a drawback of troublesome maintenance and overhaul.

Embodiments of the present invention provide a ship comprising an engine, which uses BOG to be sent to a generator as a refrigerant for heat exchange based on the fact that some BOG having a relatively low temperature and pressure is divided and sent to the generator (to the generator and the engine in the case of a low-pressure engine).

Technical Solution

In accordance with one aspect of the present invention, there is provided a ship comprising an engine, further comprising: a self-heat exchanger performing heat exchange with respect to boil-off gas (BOG) discharged from a storage tank; a multistage compressor compressing the BOG discharged from the storage tank and having passed through the self-heat exchanger in multiple stages; a first decompressor expanding some of the BOG compressed by the multistage compressor and having passed through the self-heat exchanger; a second decompressor expanding the other BOG compressed by the multistage compressor and having passed through the self-heat exchanger, wherein the self-heat exchanger cools the BOG compressed by the multistage compressor using the BOG discharged from the storage tank and the BOG expanded by the first decompressor as a refrigerant.

The BOG having passed through the second decompressor and having a gas/liquid mixed phase may be sent to the storage tank.

The ship may further include a second liquid/gas separator disposed downstream of the second decompressor and separating liquefied natural gas generated through reliquefaction of the BOG and gaseous BOG from each other, wherein the liquefied natural gas separated by the second gas/liquid separator is sent to the storage tank and the gaseous BOG separated by the second gas/liquid separator is sent to the self-heat exchanger.

Some of the BOG having passed through the multistage compressor may be sent to a high-pressure engine.

The high-pressure engine may be an ME-GI engine.

The high-pressure engine may use natural gas at a pressure of about 150 to 400 bar as fuel.

The BOG having passed through the first decompressor and the self-heat exchanger may be sent to at least one of a generator and a low-pressure engine.

The low-pressure engine may be at least one of a DF engine, an X-DF engine and a gas turbine.

The low-pressure engine may use natural gas at a pressure of about 6 to 20 bar as fuel.

The low-pressure engine may use natural gas at a pressure of 55 bar as fuel.

The generator may use natural gas at a pressure of about 6 to 10 bar as fuel.

The multistage compressor may compress the BOG to a critical pressure or more.

The multistage compressor may compress the BOG to a pressure of about 100 bar or more.

The ship may further include a valve controlling a flow amount of the gaseous BOG separated by the second gas/liquid separator and sent to the self-heat exchanger.

The ship may further include a heater disposed on a line along which the BOG having passed through the first decompressor and the self-heat exchanger is sent to the generator.

The ship may further include a first gas/liquid separator separating gaseous BOG and liquefied natural gas generated by partial reliquefaction through compression by the multistage compressor, cooling by the self-heat exchanger, and expansion by the first decompressor, wherein the self-heat exchanger cools the BOG compressed by the multistage compressor using the BOG discharged from the storage tank, the liquefied natural gas separated by the first gas/liquid separator, and the BOG separated by the first gas/liquid separator as a refrigerant.

The liquefied natural gas separated by the first gas/liquid separator and having passed through the self-heat exchanger and the BOG separated by the first gas/liquid separator and having passed through the self-heat exchanger may be joined to each other and sent to at least one of a generator and a low-pressure engine.

In accordance with another aspect of the present invention, there is provided a method including: 1) performing multistage compression with respect to boil-off gas (BOG) discharged from a storage tank (hereinafter referred to as 'flow a'), 2) subjecting the BOG subjected to multistage compression to heat exchange (hereinafter referred to as 'flow b') with the BOG discharged from the storage tank (flow a) and another refrigerant, 3) dividing the BOG subjected to heat exchange (flow b) into two flows, 4) expanding the BOG of one of the flows divided in step 3) (hereinafter referred to as 'flow c') to use the expanded BOG as the other refrigerant subjected to heat exchange with the flow b in step 2), and 5) expanding the other flow of the two flows divided in step 3).

The method may further include: 6) separating the BOG expanded in step 5) and partially reliquefied into liquefied natural gas and gaseous BOG; and 7) sending the liquefied natural gas separated in step 6) to the storage tank and joining the gaseous BOG separated in step 6) to BOG discharged from the storage tank to be used as a refrigerant for heat exchange in step 2).

Some of the BOG subjected to multistage compression in step 1) may be sent to a high-pressure engine.

The flow c used as the other refrigerant in step 4) may be sent to at least one of a generator and a low-pressure engine.

In accordance with another aspect of the present invention, there is provided a method including: 1) performing multistage compression with respect to boil-off gas (BOG) discharged from a storage tank (hereinafter referred to as 'flow a'); 2) subjecting the BOG subjected to multistage compression to heat exchange (hereinafter referred to as 'flow b') with the BOG discharged from the storage tank (flow a), a first refrigerant, and a second refrigerant; 3) dividing the BOG subjected to heat exchange (flow b) into two flows; 4) expanding the BOG of one of the flows divided in step 3); 5) separating the BOG expanded in step 4) into a liquid and a gas; 6) using the liquefied natural gas separated in step 5) (hereinafter referred to as 'flow c') as the first refrigerant subjected to heat exchange with the flow b in step 2); 7) using the BOG separated in step 5) (hereinafter referred to as 'flow d') as the second refrigerant subjected to heat exchange with the flow b in step 2); and 8) expanding the other flow of the two flows divided in step 3).

The flow c used as the first refrigerant in step 6) and the flow d used as the second refrigerant in step 7) may be joined to each other and sent to at least one of a generator and a low-pressure engine.

Some of the BOG subjected to multistage compression in step 1) may be sent to a high-pressure engine.

Advantageous Effects

According to embodiments of the invention, the ship including an engine uses not only BOG discharged from the storage tank but also BOG sent to a generator as a refrigerant in a self-heat exchanger, thereby improving reliquefaction efficiency, and allows easy maintenance and overhaul by providing one multistage compressor even in a structure wherein the ship includes a low-pressure engine.

Further, in the ship including an engine according to the embodiments of the invention, liquefied natural gas and BOG are separated by a first liquid/gas separator and are sent to a self-heat exchanger to be used as a refrigerant, thereby improving efficiency of the self-heat exchanger.

DESCRIPTION OF DRAWINGS

FIG. 1 is a schematic diagram of a partial reliquefaction system applied to a ship including a high-pressure engine in the related art.

FIG. 2 is a schematic diagram of a partial reliquefaction system applied to a ship including a low-pressure engine in the related art.

FIG. 3 is a schematic diagram of a partial reliquefaction system applied to a ship including a high-pressure engine according to a first embodiment of the present invention.

FIG. 4 is a schematic diagram of the partial reliquefaction system applied to a ship including a low-pressure engine according to the first embodiment of the present invention.

FIG. 5 is a schematic diagram of a partial reliquefaction system applied to a ship including a high-pressure engine according to a second embodiment of the present invention.

FIG. 6 is a schematic diagram of the partial reliquefaction system applied to a ship including a low-pressure engine according to the second embodiment of the present invention.

FIG. 7 is a graph depicting a phase transformation curve of methane depending upon temperature and pressure.

BEST MODE

Hereinafter, embodiments of the present invention will be described in detail with reference to the accompanying drawings. A ship including an engine according to the present invention may be applied to various marine and overland systems. It should be understood that the following embodiments can be modified in various ways and do not limit the scope of the present invention.

FIG. 3 is a schematic diagram of a partial reliquefaction system applied to a ship including a high-pressure engine according to a first embodiment of the present invention.

In this embodiment, boil-off gas (BOG) discharged from a storage tank 100 will be commonly referred to as BOG and means not only BOG in a gaseous or vapor phase, but also BOG in a gas phase, in a gas/liquid mixed phase, in a liquid phase, and in a supercritical fluid phase.

Referring to FIG. 3, the ship according to this embodiment includes: a self-heat exchanger 410 performing heat exchange with respect to BOG discharged from the storage tank 100; a multistage compressor 200 compressing the BOG discharged from the storage tank 100 and having passed through the self-heat exchanger 410 in multiple stages; a first decompressor 710 expanding some of the BOG compressed by the multistage compressor 200 and having passed through the self-heat exchanger 410; and a second decompressor 720 expanding the other BOG compressed by the multistage compressor 200 and having passed through the self-heat exchanger 410.

In this embodiment, the self-heat exchanger 410 performs heat exchange between the BOG discharged from the storage tank 100 (flow a in FIG. 3), the BOG compressed by the multistage compressor 200 (flow b in FIG. 3), and the BOG expanded by the first decompressor 710 (flow c in FIG. 3). Specifically, the self-heat exchanger 410 cools the BOG compressed by the multistage compressor 200 (flow b in FIG. 3) using the BOG discharged from the storage tank 100 (flow a in FIG. 3) and the BOG expanded by the first decompressor 710 (flow c in FIG. 3) as a refrigerant. In the term "self-heat exchanger", "self-" means that cold BOG is used as a refrigerant for heat exchange with hot BOG.

In the ship according to this embodiment, the BOG having passed through the first decompressor 710 is used as a refrigerant for additional heat exchange in the self-heat exchanger 410, thereby improving reliquefaction efficiency.

According to this embodiment, the BOG discharged from the storage tank 100 is generally used in three ways. That is, the BOG discharged from the storage tank 100 is used as fuel for the engine after being compressed to a critical pressure or more, sent to a generator after being compressed to a relatively low pressure less than or equal to the critical pressure, or reliquefied and returned to the storage tank 100 when remaining after fulfilling the amount of BOG required for the engine and the generator.

According to this embodiment, the BOG expanded by the first decompressor 710 is sent again to the self-heat exchanger 410 to be used as a refrigerant for heat exchange and then sent to the generator, based on the fact that the BOG to be sent to the generator is decreased not only in pressure and but also in temperature upon expansion.

The multistage compressor 200 performs multistage compression with respect to the BOG discharged from the storage tank 100 and having passed through the self-heat exchanger 410. The multistage compressor 200 includes a plurality of compression cylinders 210, 220, 230, 240, 250 configured to compress BOG, and a plurality of coolers 310, 320, 330, 340, 350 disposed downstream of the plurality of compression cylinders 210, 220, 230, 240, 250, respectively, and configured to cool the BOG compressed by the compression cylinders 210, 220, 230, 240, 250 and having increased pressure and temperature. In this embodiment, the multistage compressor 200 includes five compression cylinders 210, 220, 230, 240, 250 and five coolers 310, 320, 330, 340, 350, and the BOG is subjected to five stages of compression while passing through the multistage compressor 200. However, it should be understood that this embodiment is provided for illustration only and the present invention is not limited thereto.

FIG. 7 is a graph depicting a phase transformation curve of methane depending upon temperature and pressure. Referring to FIG. 7, methane has a supercritical fluid phase under conditions of about −80° C. or more and a pressure of about 50 bar or more. That is, methane has a critical point at −80° and 50 bar. The supercritical fluid phase is a third phase different from a liquid phase or a gas phase. Here, the critical point of methane can be changed depending upon the amount of nitrogen contained in boil-off gas.

On the other hand, although a fluid having a temperature less than a critical temperature at a critical pressure or more can have a phase different from a general liquid and similar to a supercritical fluid having a high density, and thus can be generally referred to as the supercritical fluid, the phase of boil-off gas having a critical pressure or more and a critical temperature or less will be referred to as "high-pressure liquid phase" hereinafter.

Referring to FIG. 7, it can be seen that, although the gas phase of natural gas having a relatively low pressure (X in FIG. 7) is kept even after reduction in temperature and pressure (X' in FIG. 7), the natural gas can become a gas/liquid mixed phase (Y' in FIG. 7) due to partial liquefaction even upon reduction in temperature and pressure after the pressure of the natural gas is raised (Y in FIG. 7). That is, it can be seen that liquefaction efficiency can further increase with increasing pressure of the natural gas before the natural gas passes through the self-heat exchanger 410 and theoretically 100% liquefaction can also be achieved (Z→Z' in FIG. 7) if the pressure can be sufficiently raised.

Accordingly, the multistage compressor 200 according to this embodiment compresses the BOG discharged from the storage tank 100 so as to reliquefy the BOG.

According to this embodiment, the first decompressor 710 expands some BOG subjected to multistage compression in the multistage compressor 200 and having passed through the self-heat exchanger 410 (flow c in FIG. 3). The first decompressor 710 may be an expansion device or an expansion valve.

According to this embodiment, the second decompressor 720 expands the other BOG subjected to multiple stages of compression in the multistage compressor 200 and having passed through the self-heat exchanger 410. The second decompressor 720 may be an expansion device or an expansion valve.

The ship according to this embodiment may further include a gas/liquid separator 500 that separates gaseous BOG and liquefied natural gas generated by partial reliquefaction of the BOG through cooling by the self-heat exchanger 410 and expansion by the second decompressor 720. The liquefied natural gas separated by the gas/liquid separator 500 may be sent to the storage tank 100 and the gaseous BOG separated by the gas/liquid separator 500 may be sent to the line along which the BOG is sent from the storage tank 100 to the self-heat exchanger 410.

The ship according to this embodiment may further include at least one of a first valve 610 blocking the BOG discharged from the storage tank 100 as needed and a heater 800 heating the BOG sent to the generator through the first decompressor 710 and the self-heat exchanger 410 (flow c in FIG. 3). The first valve 610 may be usually maintained in an open state and may be closed upon maintenance or overhaul of the storage tank 100.

In the structure wherein the ship includes the gas/liquid separator 500, the ship may further include a second valve 620 that controls the flow amount of the gaseous BOG separated by the gas/liquid separator 500 and sent to the self-heat exchanger 410.

The flow of fluid according to this embodiment will be described hereinafter. It should be noted that temperature and pressure of BOG described hereinafter are approximately theoretical values and can be changed depending upon the temperature of the BOG, the pressure required for the engine, design of the multistage compressor, the speed of the ship, and the like.

BOG generated due to intrusion of external heat inside the storage tank 100 and having a temperature of about −130° C. to −80° C. and atmospheric pressure is discharged from the storage tank 100 and sent to the self-heat exchanger 410 when the pressure of the BOG becomes a predetermined pressure or more.

The BOG discharged from the storage tank 100 and having a temperature of about −130° C. to −80° C. may be mixed with BOG separated by the gas/liquid separator 500 and having a temperature of about −160° C. to −110° C. and atmospheric pressure, and then sent to the self-heat exchanger 410 in a state that the BOG has a temperature of about −140° C. to −100° C. and atmospheric pressure.

The BOG sent from the storage tank 100 to the self-heat exchanger 410 (flow a in FIG. 3) can have a temperature of about −90° C. to 40° C. and atmospheric pressure through heat exchange with BOG having passed through the multistage compressor 200 and having a temperature of about 40° C. to 50° C. and a pressure of about 150 to 400 bar (flow b in FIG. 3) and BOG having passed through the first decompressor 710 and having a temperature of about −140° C. to −110° C. and a pressure of about 6 to 10 bar (flow c in FIG. 3). The BOG discharged from storage tank 100 (flow a in FIG. 3) is compressed together with the BOG having passed through the first decompressor 710 (flow c in FIG. 3) by the multistage compressor 200 and is used as a refrigerant for cooling the BOG sent to the self-heat exchanger 410 (flow b in FIG. 3).

The BOG discharged from the storage tank 100 and having passed through the self-heat exchanger 410 is subjected to multistage compression by the multistage compressor 200. According to this embodiment, since some of the BOG having passed through the multistage compressor 200 is used as fuel of a high-pressure engine, the BOG is compressed by the multistage compressor 200 to have a pressure required for the high-pressure engine. When the high-pressure engine is an ME-GI engine, the BOG having passed through the multistage compressor 200 has a temperature of about 40° C. to 50° C. and a pressure of about 150 to 400 bar.

Among the BOG compressed to the critical pressure or more through multistage compression by the multistage compressor 200, some BOG is used as fuel of the high-pressure engine and the other BOG is sent to the self-heat exchanger 410. The BOG compressed by the multistage compressor 200 and having passed through the self-heat exchanger 410 may have a temperature of about −130° C. to −90° C. and a pressure of about 150 to 400 bar.

The BOG compressed by the multistage compressor 200 and having passed through the self-heat exchanger 410 (flow b in FIG. 3) is divided into two flows, one of which is expanded by the first decompressor 710 and the other of which is expanded by the second decompressor 720.

The BOG expanded by the first decompressor 710 after passing through the self-heat exchanger 410 (flow c in FIG.

3) is sent again to the self-heat exchanger 410 to be used as a refrigerant for cooling the BOG having passed through the multistage compressor 200 (flow b in FIG. 3) through heat exchange and is then sent to the generator.

The BOG expanded by the first decompressor 710 after passing through the self-heat exchanger 410 may have a temperature of about −140° C. to −110° C. and a pressure of about 6 to 10 bar. Since the BOG expanded by the first decompressor 710 is sent to the generator, the BOG is expanded to a pressure of about 6 to 10 bar, which is a pressure required for the generator. In addition, the BOG having passed through the first decompressor 710 may have a gas/liquid mixed phase.

The BOG having passed through the self-heat exchanger 410 after being expanded by the first decompressor 710 may have a temperature of about −90° C. to 40° C. and a pressure of about 6 to 10 bar, and the BOG having passed through the first decompressor 710 may become a gas phase through heat exchange in the self-heat exchanger 410.

The BOG sent to the generator after having passed through the first decompressor 710 and the self-heat exchanger 410 may be controlled to a temperature, which is required for the generator, by the heater 800 disposed upstream of the generator. The BOG having passed through the heater 800 may have a gas phase having a temperature of about 40° C. to 50° C. and a pressure of about 6 to 10 bar.

The BOG expanded by the second decompressor 720 after having passed through the self-heat exchanger 410 may have a temperature of about −140° C. to −110° C. and a pressure of about 2 to 10 bar. In addition, the BOG having passed through the second decompressor 720 is partially liquefied. The BOG partially liquefied in the second decompressor 720 may be sent in a gas/liquid mixed phase to the storage tank 100 or may be sent to the gas/liquid separator 500, by which the gas/liquid mixed phase is separated into a liquid phase and a gas phase.

When the partially reliquefied BOG is sent to the gas/liquid separator 500, the liquefied natural gas separated by the gas/liquid separator 500 and having a temperature of about −163° C. and atmospheric pressure is sent to the storage tank 100, and the gaseous BOG separated by the gas/liquid separator 500 and having a temperature of about −160° C. to −110° C. and atmospheric pressure is sent together with the BOG discharged from the storage tank 100 to the self-heat exchanger 410. The flow amount of the BOG separated by the gas/liquid separator 500 and sent to the self-heat exchanger 410 may be controlled by the second valve 620.

FIG. 4 is a schematic diagram of the partial reliquefaction system applied to a ship including a low-pressure engine according to the first embodiment of the present invention.

The partial reliquefaction system applied to the ship including a low-pressure engine shown in FIG. 4 is different from the partial reliquefaction system applied to the ship including a high-pressure engine shown in FIG. 3 in that some BOG subjected to multistage compression by the multistage compressor 200 is sent to the generator and/or the engine after having passed through the first decompressor 710 and the self-heat exchanger 410, and the following description will focus on different configuration of the partial reliquefaction system. Descriptions of details of the same components as those of the ship including the high-pressure engine described above will be omitted.

Differentiation between the high-pressure engine included in the ship to which the partial reliquefaction system shown in FIG. 3 is applied and the low-pressure engine included in the ship to which the partial reliquefaction system shown in FIG. 4 is applied is based on use of natural gas having a critical pressure or more as fuel by the engine. That is, an engine using natural gas having a critical pressure or more as fuel is referred to as the high-pressure engine, and an engine using natural gas having a pressure of less than the critical pressure as fuel is referred to as the low-pressure engine. This standard is also commonly applied to a high-pressure engine included in a ship to which a partial reliquefaction system shown in FIG. 5 is applied and a low-pressure engine included in a ship to which a partial reliquefaction system shown in FIG. 6 is applied.

The high-pressure engine may be an ME-GI engine that uses natural gas at a pressure of about 300 bar as fuel, and the low-pressure engine may be a DF engine that uses natural gas at a pressure of about 6 bar as fuel. The partial reliquefaction system according to the present invention may be applied to a ship including a medium pressure engine, such as an X-DF engine, which uses natural gas at a pressure of about 20 bar as fuel. This is also applied to the partial reliquefaction system according to the second embodiment shown in FIG. 5 and FIG. 6.

Referring to FIG. 4, as in the ship including the high-pressure engine shown in FIG. 3, the ship according to this embodiment includes a self-heat exchanger 410, a multistage compressor 200, a first decompressor 710, and a second decompressor 720.

As in the ship including the high-pressure engine shown in FIG. 3, the self-heat exchanger 410 according to this embodiment performs heat exchange between BOG discharged from the storage tank 100 (flow a in FIG. 4), BOG compressed by the multistage compressor 200 (flow b in FIG. 4), and BOG expanded by the first decompressor 710 (flow c in FIG. 4). Specifically, the self-heat exchanger 410 cools the BOG compressed by the multistage compressor 200 (flow b in FIG. 4) using the BOG discharged from the storage tank 100 (flow a in FIG. 4) and the BOG expanded by the first decompressor 710 (flow c in FIG. 4) as a refrigerant.

As in the ship including the high-pressure engine shown in FIG. 3, the multistage compressor 200 according to this embodiment performs multistage compression with respect to the BOG discharged from the storage tank 100 and having passed through the self-heat exchanger 410. As in the ship including the high-pressure engine shown in FIG. 3, the multistage compressor 200 according to this embodiment may include a plurality of compression cylinders 210, 220, 230, 240, 250 and a plurality of coolers 310, 320, 330, 340, 350.

As in the ship including the high-pressure engine shown in FIG. 3, the first decompressor 710 according to this embodiment expands some of the BOG subjected to multistage compression in the multistage compressor 200 and having passed through the self-heat exchanger 410 (flow c in FIG. 4). The first decompressor 710 may be an expansion device or an expansion valve.

As in the ship including the high-pressure engine shown in FIG. 3, the second decompressor 720 according to this embodiment expands the other BOG subjected to multiple stages of compression in the multistage compressor 200 and having passed through the self-heat exchanger 410. The second decompressor 720 may be an expansion device or an expansion valve.

As in the ship including the high-pressure engine shown in FIG. 3, the ship according to this embodiment may further include a gas/liquid separator 500 that separates gaseous BOG and liquefied natural gas generated by partial reliquefaction of the BOG through cooling by the self-heat exchanger 410 and expansion by the second decompressor 720. The liquefied natural gas separated by the gas/liquid separator 500 may be sent to the storage tank 100 and the gaseous BOG separated by the gas/liquid separator 500 may be sent to the line along which the BOG is sent from the storage tank 100 to the self-heat exchanger 410.

As in the ship including the high-pressure engine shown in FIG. 3, the ship according to this embodiment may further include at least one of a first valve 610 blocking the BOG discharged from the storage tank 100 as needed; and a heater 800 heating the BOG sent to the generator through the first decompressor 710 and the self-heat exchanger 410 (flow c in FIG. 4).

Further, as in the ship including the high-pressure engine shown in FIG. 3, in the structure wherein the ship includes the gas/liquid separator 500, the ship may further include a second valve 620 that controls the flow amount of the gaseous BOG separated by the gas/liquid separator 500 and sent to the self-heat exchanger 410.

The flow of fluid according to this embodiment will be described hereinafter.

BOG generated due to intrusion of external heat inside the storage tank 100 and having a temperature of about −130° C. to −80° C. and atmospheric pressure is discharged from the storage tank 100 and sent to the self-heat exchanger 410 when the pressure of the BOG becomes a predetermined pressure or more, as in the ship including the high-pressure engine shown in FIG. 3.

The BOG discharged from the storage tank 100 and having a temperature of about −130° C. to −80° C. may be mixed with BOG separated by the gas/liquid separator 500 and having a temperature of about −160° C. to −110° C. and atmospheric pressure, and then sent to the self-heat exchanger 410 in a state that the BOG has a temperature of about −140° C. to −100° C. and atmospheric pressure, as in the ship including the high-pressure engine shown in FIG. 3.

The BOG sent from the storage tank 100 to the self-heat exchanger 410 (flow a in FIG. 4) can have a temperature of about −90° C. to 40° C. and atmospheric pressure through heat exchange with BOG having passed through the multistage compressor 200 and having a temperature of about 40° C. to 50° C. and a pressure of about 100 to 300 bar (flow b in FIG. 4) and BOG having passed through the first decompressor 710 and having a temperature of about −140° C. to −110° C. and a pressure of about 6 to 20 bar (flow c in FIG. 4). The BOG discharged from storage tank 100 (flow a in FIG. 4) is compressed together with the BOG having passed through the first decompressor 710 (flow c in FIG. 4) by the multistage compressor 200 and is used as a refrigerant for cooling the BOG sent to the self-heat exchanger 410 (flow b in FIG. 4).

The BOG discharged from the storage tank 100 and having passed through the self-heat exchanger 410 is subjected to multistage compression by the multistage compressor 200, as in the ship including the high-pressure engine shown in FIG. 3.

Unlike the ship shown in FIG. 2, the ship including the low-pressure engine according to this embodiment includes a single multistage compressor, thereby enabling easy maintenance and overhaul.

However, according to this embodiment, all of the BOG compressed to the critical pressure or more through multistage compression by the multistage compressor 200 is sent to the self-heat exchanger 410, unlike the ship including the high-pressure engine shown in FIG. 3, in which some of the BOG compressed to the critical pressure or more by the multistage compressor 200 is sent thereto.

According to this embodiment, since some of the BOG having passed through the multistage compressor 200 is not directly sent to the engine, there is no need for the multistage compressor 200 to compress the BOG to a pressure required for the engine, unlike the ship including the high-pressure engine shown in FIG. 3. However, for reliquefaction efficiency, the BOG is preferably compressed to the critical pressure or more, more preferably 100 bar or more, by the multistage compressor 200. The BOG having passed through the multistage compressor 200 may have a temperature of about 40° C. to 50° C. and a pressure of about 100 to 300 bar.

The BOG compressed by the multistage compressor 200 and having passed through the self-heat exchanger 410 (flow b in FIG. 4) is divided into two flows, one of which is expanded by the first decompressor 710 and the other of which is expanded by the second decompressor 720, as in the ship including the high-pressure engine shown in FIG. 3. The BOG compressed by the multistage compressor 200 and having passed through the self-heat exchanger 410 may have a temperature of about −130° C. to −90° C. and a pressure of about 100 to 300 bar.

The BOG expanded by the first decompressor 710 after passing through the self-heat exchanger 410 (flow c in FIG. 3) is sent again to the self-heat exchanger 410 to be used as a refrigerant for cooling the BOG having passed through the multistage compressor 200 (flow b in FIG. 3) through heat exchange, as in the ship including the high-pressure engine shown in FIG. 3.

In this embodiment, the BOG subjected to heat exchange in the self-heat exchanger 410 after being expanded by the first decompressor 710 may be sent not only to the generator but also to the low-pressure engine, unlike the ship including the high-pressure engine shown in FIG. 3.

The BOG expanded by the first decompressor 710 after passing through the self-heat exchanger 410 may have a temperature of about −140° C. to −110° C. and a pressure of about 6 to 20 bar. Here, when the low-pressure engine is a gas turbine, the BOG expanded by the first decompressor 710 after passing through the self-heat exchanger 410 may have a pressure of about 55 bar.

Since the BOG expanded by the first decompressor 710 is sent to the low-pressure engine and/or the generator, the BOG is expanded to a pressure required for the low-pressure engine and/or the generator. In addition, the BOG having passed through the first decompressor 710 may have a gas/liquid mixed phase.

The BOG having passed through the self-heat exchanger 410 after being expanded by the first decompressor 710 may have a temperature of about −90° C. to 40° C. and a pressure of about 6 to 20 bar, and the BOG having passed through the first decompressor 710 may become a gas phase through heat exchange in the self-heat exchanger 410. Here, when the low-pressure engine is a gas turbine, the BOG having passed through the self-heat exchanger 410 after being expanded by the first decompressor 710 may have a pressure of about 55 bar.

The BOG sent to the generator after having passed through the first decompressor 710 and the self-heat exchanger 410 may be controlled to a temperature, which is required for the generator, by the heater 800, as in the ship including the high-pressure engine shown in FIG. 3. The BOG having passed through the heater 800 may have a temperature of about 40° C. to 50° C. and a pressure of about 6 to 20 bar. Here, when the low-pressure engine is a gas turbine, the BOG having passed through the heater 800 may have a pressure of about 55 bar.

The generator requires a pressure of about 6 to 10 bar and the low-pressure engine requires a pressure of about 6 to 20 bar. The low-pressure engine may be a DF engine, an X-DF engine, or a gas turbine. Here, when the low-pressure engine is a gas turbine, the gas turbine requires a pressure of about 55 bar.

The BOG expanded by the second decompressor 720 after having passed through the self-heat exchanger 410 may have a temperature of about −140° C. to −110° C. and a pressure of about 2 to 10 bar, as in the ship including the high-pressure engine shown in FIG. 3. In addition, the BOG having passed through the second decompressor 720 is partially reliquefied, as in the ship including the high-pressure engine shown in FIG. 3. The BOG partially reliquefied in the second decompressor 720 may be sent in a gas/liquid mixture state to the storage tank 100 or may be sent to the gas/liquid separator 500, by which the gas/liquid mixed phase is separated into a liquid phase and a gas phase, as in the ship including the high-pressure engine shown in FIG. 3.

As in the ship including the high-pressure engine shown in FIG. 3, when the partially reliquefied BOG is sent to the gas/liquid separator 500, the liquefied natural gas separated by the gas/liquid separator 500 and having a temperature of about −163° C. and atmospheric pressure is sent to the storage tank 100, and the gaseous BOG separated by the gas/liquid separator 500 and having a temperature of about −160° C. to −110° C. and atmospheric pressure is sent together with the BOG discharged from the storage tank 100 to the self-heat exchanger 410. The flow amount of the BOG separated by the gas/liquid separator 500 and sent to the self-heat exchanger 410 may be controlled by the second valve 620.

FIG. 5 is a schematic diagram of a partial reliquefaction system applied to a ship including a high-pressure engine according to a second embodiment of the present invention.

Referring to FIG. 5, the ship according to this embodiment includes: a self-heat exchanger 410 performing heat exchange of BOG discharged from the storage tank 100; a multistage compressor 200 compressing the BOG discharged from the storage tank 100 and having passed through the self-heat exchanger 410 in multiple stages; a first decompressor 710 expanding some of the BOG compressed by the multistage compressor 200 and having passed through the self-heat exchanger 410; a second decompressor 720 expanding the other BOG compressed by the multistage compressor 200 and having passed through the self-heat exchanger 410; and a first gas/liquid separator 520 separating gaseous BOG and liquefied natural gas generated by partial reliquefaction through expansion by the first decompressor 710 after compression by the multistage compressor 200 and cooling by the self-heat exchanger 410.

In this embodiment, the self-heat exchanger 410 performs heat exchange between the BOG discharged from the storage tank 100 (flow a), the BOG compressed by the multistage compressor 200 (flow b), the liquefied natural gas separated by the first gas/liquid separator 520 (flow c), and the BOG separated by the first gas/liquid separator 520 (flow d).

Specifically, the self-heat exchanger 410 cools the BOG compressed by the multistage compressor 200 (flow b) using the BOG discharged from the storage tank 100 (flow a in FIG. 5), the liquefied natural gas separated by the first gas/liquid separator 520 (flow c), and the BOG separated by the first gas/liquid separator 520 (flow d) as a refrigerant.

According to this embodiment, the BOG discharged from the storage tank 100 is generally used in three ways. That is, the BOG discharged from the storage tank 100 is used as fuel for the engine after being compressed to the critical pressure or more, sent to a generator after being compressed to a relatively low pressure less than or equal to the critical pressure, or reliquefied and returned to the storage tank 100 when remaining after fulfilling the amount of BOG required for the engine and the generator.

According to this embodiment, the BOG expanded by the first decompressor 710 is sent again to the self-heat exchanger 410 to be used as a refrigerant for heat exchange and then sent to the generator, based on the fact wherein the BOG to be sent to the generator is decreased not only in pressure and but also in temperature upon expansion.

In this embodiment, instead of directly sending the BOG expanded by the first decompressor 710 to the self-heat exchanger 410, the BOG expanded by the first decompressor 710 is divided into liquefied natural gas and BOG by the first gas/liquid separator 520 such that the liquefied natural gas and the BOG separated by the first gas/liquid separator 520 can be sent to the self-heat exchanger 410, as described below.

The multistage compressor 200 according to this embodiment performs multistage compression with respect to the BOG discharged from the storage tank 100 and having passed through the self-heat exchanger 410 (flow a). The multistage compressor 200 according to this embodiment includes a plurality of compression cylinders 210, 220, 230, 240, 250 configured to compress BOG, and a plurality of coolers 310, 320, 330, 340, 350 disposed downstream of the plurality of compression cylinders 210, 220, 230, 240, 250, respectively, and configured to cool the BOG compressed by the compression cylinders 210, 220, 230, 240, 250 and having increased pressure and temperature. In this embodiment, the multistage compressor 200 includes five compression cylinders 210, 220, 230, 240, 250 and five coolers 310, 320, 330, 340, 350, and the BOG is subjected to five stages of compression while passing through the multistage compressor 200. However, it should be understood that this embodiment is provided for illustration only and the present invention is not limited thereto.

According to this embodiment, the first decompressor 710 expands some of the BOG subjected to multistage compression in the multistage compressor 200 and having passed through the self-heat exchanger 410 (flow b), and sends the expanded BOG to the first gas/liquid separator 520. The first decompressor 710 may be an expansion device or an expansion valve.

The ship including an engine according to this embodiment uses the fluid having passed through the first decompressor 710 as a refrigerant for additional heat exchange in the self-heat exchanger 410, thereby improving reliquefaction efficiency.

The first gas/liquid separator 520 according to this embodiment separates gaseous BOG and liquefied natural gas generated by partial reliquefaction of the BOG through expansion by the first decompressor 710 after compression by the multistage compressor 200 and cooling by the self-heat exchanger 410. The liquefied natural gas separated by the first gas/liquid separator 520 (flow c) and the BOG separated by the first gas/liquid separator 520 (flow d) are independently sent to the self-heat exchanger 410 to be used as a refrigerant for cooling the BOG compressed by the multistage compressor 200 and sent to the self-heat exchanger 410 (flow b).

If the ship does not include the first gas/liquid separator 520 and is configured to send the fluid expanded by the first decompressor 710 to the self-heat exchanger 410 to be used as a refrigerant, a fluid of a gas/liquid mixed phase is introduced into the self-heat exchanger 410 and thus can unevenly flow in a fluid channel of the self-heat exchanger 410, thereby causing deterioration in efficiency of heat exchange of the self-heat exchanger 410. Therefore, according to this embodiment, the liquefied natural gas and the BOG separated by the first gas/liquid separator 520 are independently sent to the self-heat exchanger 410, thereby preventing deterioration in efficiency of heat exchange of the self-heat exchanger 410.

According to this embodiment, the second decompressor 720 expands some BOG not sent to the first decompressor 710 among the BOG subjected to multiple stages of compression in the multistage compressor 200 and having passed through the self-heat exchanger 410 (flow b). The second decompressor 720 may be an expansion device or an expansion valve. Some or all of the BOG having passed through the multistage compressor 200, the self-heat exchanger 410 and the second decompressor 720 is reliquefied.

The ship according to this embodiment may further include a second gas/liquid separator 510, which separates gaseous BOG and liquefied natural gas generated by partial reliquefaction of the BOG through the multistage compressor 200, the self-heat exchanger 410 and the second decompressor 720. The liquefied natural gas separated by the second gas/liquid separator 510 may be sent to the storage tank 100, and the gaseous BOG separated by the second gas/liquid separator 510 may be joined to the BOG discharged from the storage tank 100 (flow a) and sent to the self-heat exchanger 410.

The ship according to this embodiment may further include at least one of a first valve 610 blocking the BOG discharged from the storage tank 100 as needed, and a heater 800 heating the BOG and disposed on a line, along which the liquefied natural gas separated by the first gas/liquid separator 520 and used as a refrigerant in the self-heat exchanger 410 (flow c) and the BOG separated by the first gas/liquid separator 520 and used as a refrigerant in the self-heat exchanger 410 (flow d) are joined to each other and sent to the generator. The first valve 610 may be usually maintained in an open state and may be closed upon maintenance or overhaul of the storage tank 100.

In the structure wherein the ship includes the second gas/liquid separator 510, the ship may further include a second valve 620 that controls the flow amount of the gaseous BOG separated by the second gas/liquid separator 510 and sent to the self-heat exchanger 410.

FIG. 6 is a schematic diagram of the partial reliquefaction system applied to a ship including a low-pressure engine according to the second embodiment of the present invention.

The partial reliquefaction system applied to the ship including a low-pressure engine shown in FIG. 6 is different from the partial reliquefaction system applied to the ship including a high-pressure engine shown in FIG. 5 in that liquefied natural gas and BOG separated by the first gas/liquid separator 520 are joined to each other after having passed through the self-heat exchanger 410, and then sent to the generator and/or the engine, instead of sending some BOG subjected to multistage compression by the multistage compressor 200 to the engine, and the following description will focus on different configuration of the partial reliquefaction system. Descriptions of details of the same components as those of the ship including the high-pressure engine described above will be omitted.

Referring to FIG. 6, as in the ship including the high-pressure engine shown in FIG. 5, the ship according to this embodiment includes a self-heat exchanger 410, a multistage compressor 200, a first decompressor 710, a second decompressor 720, and a first gas/liquid separator 520.

As in the ship including the high-pressure engine shown in FIG. 5, the self-heat exchanger 410 according to this embodiment performs heat exchange between BOG discharged from the storage tank 100 (flow a), BOG compressed by the multistage compressor 200 (flow b), liquefied natural gas separated by the first gas/liquid separator 520 (flow c), and BOG separated by the first gas/liquid separator 520 (flow d). Specifically, the self-heat exchanger 410 cools the BOG compressed by the multistage compressor 200 (flow b in FIG. 4) using the BOG discharged from the storage tank 100 (flow a in FIG. 5), the liquefied natural gas separated by the first gas/liquid separator 520 (flow c); and the BOG separated by the first gas/liquid separator 520 (flow d) as a refrigerant.

As in the ship including the high-pressure engine shown in FIG. 5, the multistage compressor 200 according to this embodiment performs multistage compression with respect to the BOG discharged from the storage tank 100 and having passed the self-heat exchanger 410 (flow a). As in the ship including the high-pressure engine shown in FIG. 5, the multistage compressor 200 may include a plurality of compression cylinders 210, 220, 230, 240, 250 and a plurality of coolers 310, 320, 330, 340, 350.

As in the ship including the high-pressure engine shown in FIG. 5, the first decompressor 710 according to this embodiment expands some of the BOG subjected to multistage compression in the multistage compressor 200 and having passed through the self-heat exchanger 410 (flow b in FIG. 4), and sends the expanded BOG to the first gas/liquid separator 520. The first decompressor 710 may be an expansion device or an expansion valve.

As in the ship including the high-pressure engine shown in FIG. 5, the first gas/liquid separator 520 according to this embodiment separates gaseous BOG and liquefied natural gas generated by partial reliquefaction of the BOG through expansion by the first decompressor 710 after compression by the multistage compressor 200 and cooling by the self-heat exchanger 410. The liquefied natural gas separated by the first gas/liquid separator 520 (flow c) and the BOG separated by the first gas/liquid separator 520 (flow d) are independently sent to the self-heat exchanger 410 to be used as a refrigerant for cooling the BOG compressed by the multistage compressor 200 and sent to the self-heat exchanger 410 (flow b).

As in the ship including the high-pressure engine shown in FIG. 5, the second decompressor 720 according to this embodiment expands some BOG not sent to the first decompressor 710 among the BOG subjected to multistage compression in the multistage compressor 200 and having passed through the self-heat exchanger 410 (flow b). The second decompressor 720 may be an expansion device or an expansion valve. Some or all of the BOG having passed through the multistage compressor 200, the self-heat exchanger 410 and the second decompressor 720 is reliquefied.

As in the ship including the high-pressure engine shown in FIG. 5, the ship according to this embodiment may further include a second gas/liquid separator 510, which separates gaseous BOG and liquefied natural gas generated by partial reliquefaction of the BOG through the multistage compressor 200, the self-heat exchanger 410 and the second decompressor 720. The liquefied natural gas separated by the second gas/liquid separator 510 may be sent to the storage tank 100, and the gaseous BOG separated by the second gas/liquid separator 510 may be joined to the BOG discharged from the storage tank 100 (flow a) and sent to the self-heat exchanger 410.

As in the ship including the high-pressure engine shown in FIG. 5, the ship according to this embodiment may further include at least one of a first valve 610 blocking the BOG discharged from the storage tank 100 as needed, and a heater 800 heating the BOG and disposed on the line, along which the liquefied natural gas separated by the first gas/liquid separator 520 and used as a refrigerant in the self-heat exchanger 410 (flow c) and the BOG separated by the first gas/liquid separator 520 and used as a refrigerant in the self-heat exchanger 410 (flow d) are joined to each other and sent to the generator.

In the structure wherein the ship includes the second gas/liquid separator 510, the ship according to this embodiment may further include a second valve 620 that controls the flow amount of the gaseous BOG separated by the second gas/liquid separator 510 and sent to the self-heat exchanger 410, as in the ship including the high-pressure engine shown in FIG. 5.

It will be apparent to those skilled in the art that the present invention is not limited to the embodiments described above and various modifications, changes, alterations, and equivalent embodiments can be made art without departing from the spirit and scope of the present invention.

The invention claimed is:

1. A ship comprising:
   a storage tank configured to store liquefied gas;
   a boil-off gas line configured to flow boil-off gas discharged from the storage tank;
   a compressor configured to receive boil-off gas from the boil-off gas line and to compress the boil-off gas to provide compressed boil-off gas having a pressure in a first range between 150 and 400 bar;
   a first line configured to flow a first flow of compressed boil-off gas comprising a portion of the compressed boil-off gas from the compressor;
   a high-pressure engine configured to receive the first flow of compressed boil-off gas from the first line and to consume the first flow of compressed boil-off gas at a pressure in the first range;
   a second line configured to flow a second flow of compressed boil-off gas comprising a portion of the compressed boil-off gas from the compressor;
   a heat exchanger configured to cool the second flow of compressed boil-off gas flowing the second line to provide a cooled second flow to a cooled second line;
   a re-liquefaction decompressor located downstream the heat exchanger to receive a first portion of the cooled second flow from the cooled second line;
   a cooling decompressor located downstream the heat exchanger to receive a second portion of the cooled second flow from the cooled second line;
   wherein re-liquefaction decompressor receiving the first portion of the cooled second flow is configured to liquefy the received first portion of the cooled second flow from the cooled second line to provide a liquefied flow for sending to the storage tank,
   wherein the cooling decompressor receiving the second portion of the cooled second flow is configured to decompress the received second portion of the cooled second flow from the cooled second line to generate a cooled flow of decompressed boil-off gas and further configured to return the cooled flow of decompressed boil-off gas to the heat exchanger for cooling the second flow of compressed boil-off gas, and
   a low-pressure engine or generator configured to receive the cooled flow of decompressed boil-off gas that has cooled the second flow of compressed boil-off gas in the heat exchanger and to consume the cooled flow of decompressed boil-off gas at a pressure in a second range higher than 0 bar and lower than 20 bar.

2. The ship according to claim 1, further comprising:
   a gas/liquid separator, which is disposed downstream of the re-liquefaction decompressor, configured to separate liquefied gas for returning to the storage tank.

3. The ship according to claim 1, wherein the high-pressure engine is an ME-GI engine.

4. The ship according to claim 1, wherein the low-pressure engine or generator is at least one of a DF engine, an X-DF engine and a gas turbine.

5. The ship according to claim 1, wherein the second range is between about 6 to 20 bar.

6. The ship according to claim 1, wherein the compressor is a multistage compressor.

7. The ship according to claim 2, wherein a gaseous flow of boil-off gas separated at the gas/liquid separator is sent to at least one of a generator and a low-pressure engine.

8. A method of operating the ship of claim 1, the method comprising:
   compressing, at the compressor, the boil-off gas from the boil-off gas line to provide the compressed boil-off gas having a pressure in the first range;
   consuming, at the high-pressure engine, consume the first flow of compressed boil-off gas at a pressure in the first range;
   liquefying, at re-liquefaction decompressor, the first portion of the second flow to return to the storage tank;
   expanding, at cooling decompressor, the second portion of the second flow to provide the cooled flow of decompressed boil-off gas; and
   cooling, at the heat exchanger, the second flow flowing the second line with the boil-off gas flowing the boil-off gas line and further with the cooled flow of decompressed boil-off gas from the cooling decompressor.

9. A method comprising:
   1) performing multistage compression with respect to boil-off gas (BOG) discharged from a storage tank (hereinafter referred to as 'flow a');
   2) subjecting the BOG subjected to multistage compression to heat exchange (hereinafter referred to as 'flow b') with the BOG discharged from the storage tank (flow a), a first refrigerant, and a second refrigerant;
   3) dividing the BOG subjected to heat exchange (flow b) into two flows;
   4) expanding the BOG of one of the flows divided in step 3);
   separating the BOG expanded in step 4) into a liquid and a gas;
   6) using the liquid separated in step 5) (hereinafter referred to as 'flow c') as the first refrigerant subjected to heat exchange with the flow b in step 2);
   7) using the gas separated in step 5) (hereinafter referred to as 'flow d') as the second refrigerant subjected to heat exchange with the flow b in step 2); and
   8) expanding the other flow of the two flows divided in step 3).

10. The method according to claim 9, wherein the flow c used as the first refrigerant in step 6) and the flow d used as the second refrigerant in step 7) are joined to each other and sent to at least one of a generator and a low-pressure engine.

11. The method according to claim 9, wherein some of the BOG subjected to multistage compression in step 1) is sent to a high-pressure engine.

\* \* \* \* \*